United States Patent
Båstedt et al.

(10) Patent No.: US 11,940,343 B2
(45) Date of Patent: Mar. 26, 2024

(54) BEARING HAVING A SINGLE OPTICAL SENSING FIBER FOR LOAD SENSING AND BEARING UNIT COMPRISING COMBINED BEARINGS

(71) Applicant: Aktiebolaget SKF, Gothenburg (SE)

(72) Inventors: Håkan Båstedt, Hålta (SE); Alexander Mocnik, Steyr (AT); Stijn van Eesbeek, Doorn (BE)

(73) Assignee: Aktiebolaget SKF, Gothenburg (SE)

( * ) Notice: Subject to any disclaimer, the term of this patent is extended or adjusted under 35 U.S.C. 154(b) by 808 days.

(21) Appl. No.: 17/010,201

(22) Filed: Sep. 2, 2020

(65) Prior Publication Data
US 2021/0088393 A1    Mar. 25, 2021

(30) Foreign Application Priority Data

Sep. 23, 2019    (DE) .......................... 102019214488.8

(51) Int. Cl.
*F16C 19/52*    (2006.01)
*F16C 19/54*    (2006.01)
(Continued)

(52) U.S. Cl.
CPC .......... *G01L 5/0009* (2013.01); *F16C 19/522* (2013.01); *F16C 19/542* (2013.01); *F16C 33/586* (2013.01); *G01L 1/242* (2013.01)

(58) Field of Classification Search
CPC .... F16C 19/422; F16C 19/541; F16C 19/542; F16C 19/543; F16C 33/586;
(Continued)

(56) References Cited

U.S. PATENT DOCUMENTS

| 8,195,015 B2 * | 6/2012 | Becker | G01L 5/0009 356/138 |
| 8,790,013 B2 * | 7/2014 | Reedman | G01M 13/04 384/448 |

(Continued)

FOREIGN PATENT DOCUMENTS

| CN | 106596104 A | * 4/2017 | ............ G01M 13/04 |
| CN | 110645266 A | * 1/2020 | ............ F16C 23/02 |

(Continued)

OTHER PUBLICATIONS

Kahlman 2017 Fiber Optical Sensing of Bearing Performance and Pumpconditions.
Hoffmann 2007 SPIE FBG machine monitoring SPI article.

*Primary Examiner* — Phillip A Johnson
(74) *Attorney, Agent, or Firm* — GARCIA-ZAMOR INTELLECTUAL PROPERTY LAW, LLC; Ruy Garcia-Zamor

(57) ABSTRACT

A bearing providing a first ring, a second ring and at least one row of rolling elements radially located between raceways disposed on the first and second ring, a single optical sensing fiber mounted in a groove provided on a surface of the first ring radially opposite to the raceway of the first ring, the fiber having at least a sensing part. The groove including a first branch extending from a first frontal surface of the first ring and being at least partially incurved along at least one radius of curvature to extend towards a circumferential groove parallel to the first frontal surface; a second branch extending from a second frontal radial surface of the first ring, axially opposite to the first frontal surface, connected to the first branch, the second branch being at least partially incurved along at least one radius of curvature.

10 Claims, 11 Drawing Sheets

(51) Int. Cl.
*F16C 33/58* (2006.01)
*G01L 1/24* (2006.01)
*G01L 5/00* (2006.01)

(58) Field of Classification Search
CPC ...... F16C 2233/00; G01L 1/242; G01L 1/243; G01L 1/245; G01L 1/246; G01L 5/0009; G01M 13/04
See application file for complete search history.

(56) References Cited

U.S. PATENT DOCUMENTS

| | | | | |
|---|---|---|---|---|
| 9,014,518 | B2 * | 4/2015 | Reedman | G02B 6/0208 |
| | | | | 385/13 |
| 9,103,733 | B2 * | 8/2015 | Reedman | G01L 5/0009 |
| 9,546,690 | B2 * | 1/2017 | Herdier | F16C 19/522 |
| 9,746,387 | B2 * | 8/2017 | Yang | G01M 13/04 |
| 10,302,512 | B2 * | 5/2019 | Heim | F16C 33/586 |
| 10,428,871 | B2 * | 10/2019 | Yang | F16C 19/522 |
| 10,641,324 | B2 * | 5/2020 | Sorlier | G01P 3/443 |
| 2016/0305845 | A1 * | 10/2016 | van der Ham | F16C 41/008 |

FOREIGN PATENT DOCUMENTS

| | | | | |
|---|---|---|---|---|
| DE | 102007050576 A1 * | 4/2009 | | G01L 1/242 |
| DE | 102015208444 A1 | 12/2016 | | |
| DE | 102017217813 A1 | 4/2019 | | |
| FR | 2961871 A1 * | 12/2011 | | G01L 1/242 |
| WO | 2011/066926 A1 | 6/2011 | | |
| WO | 2011/066927 A1 | 6/2011 | | |
| WO | 2011/066928 A1 | 6/2011 | | |
| WO | 2013/186256 A1 | 12/2013 | | |
| WO | 2013/186258 A1 | 12/2013 | | |
| WO | 2013/186354 A1 | 12/2013 | | |
| WO | 2014/090332 A1 | 6/2014 | | |
| WO | WO-2014090324 A1 * | 6/2014 | | F16C 19/522 |
| WO | 2016/096031 A1 | 6/2016 | | |

* cited by examiner

BEARING HAVING A SINGLE OPTICAL SENSING FIBER FOR LOAD SENSING AND BEARING UNIT COMPRISING COMBINED BEARINGS

CROSS-REFERENCE TO RELATED APPLICATIONS

This application claims priority to German Patent Application no. 102019214488.8, filed Sep. 23, 2019, the contents of which is fully incorporated herein by reference.

BACKGROUND OF THE INVENTION

The present invention relates to the field of condition monitoring of rolling bearings for control processing by actively sensing loads. More particularly, the invention relates to rolling bearings equipped with an optical sensing element, such as an optical fiber.

An optical fiber generally comprises a plurality of fiber Bragg gratings, called FBG, for sensing locations evenly spread around the circumference of the ring of the bearing, for example for sensing at least one location additional to the rolling elements.

Fiber optical sensing can be used in monitoring pumps, compressors and other rotary machines, but also oil and gas, mines, marine, paper making (pulp & paper), aerospace etc . . . , and any installations where long-distance signals are needed.

Reference can be made to document WO 2011/066926 which describes an example of a cable bearing having a circumferential groove on an outer ring of the bearing, the groove accommodates a sensing fiber for measuring, in particular bearing loads.

In order to measure combined axial and radial bearing loads, it is known to accommodate a first optical fiber in a first groove provided on an outer circumferential surface of the outer ring and a second optical fiber in a second groove provided on an axial surface of the outer ring.

There is a need to provide an improved design configured to enable simple mounting in a bearing housing without any optical fiber on bearing side faces, to enable matching several bearings together in variable directions without breaking fibers by to narrow bending portions of the fiber, to ensure safe transport without nicks at sharp corners. There is also a need to improve sensing devices configured to sense combined axial and radial loads.

The aim of the present invention is consequently to provide a bearing with a single sensing device configured to enable accurate sensing of combined axial and radial loads, including the directions of the radial load.

SUMMARY OF THE INVENTION

It is a particular object of the present invention to provide a bearing comprising a first ring, a second ring and at least one row of rolling elements radially located between raceways provided on the first and second ring.

The bearing further comprises a single optical sensing fiber mounted in a groove provided on a surface of the first ring radially opposite to the raceway of the first ring. The optical fiber comprises at least one sensing part.

The groove is provided with:
a first branch extending from a first frontal surface of the first ring and being at least partially incurved along at least one radius of curvature to extend towards a circumferential groove parallel to the first frontal surface; at least the sensing part of the optical fiber coming out into the circumferential groove; and
a second branch extending from a second frontal radial surface of the first ring, axially opposite to the first frontal surface, connected to the first branch, the second branch being at least partially incurved along at least one radius of curvature.

The optical fiber may comprise a plurality of fiber Bragg gratings, called FBG, for sensing locations evenly spread around the circumference of the first ring of the bearing. For example, the fiber Bragg gratings are used to measure local strain in the circumferential groove.

The particular shape of the groove enables the optical fiber to exit the first ring in both axial directions without bending the optical fiber below a minimum bending radius, for example comprised between 5 mm to 10 mm. The particular shape of the groove also allows the sensing part of the fiber to be close enough to the element to be sensed without any gaps.

For example, radial and axial loads may be calculated using a load estimating method for estimating a bearing load implemented in an electronically control unit of a bearing assembly having a bearing comprising a first ring, a second ring, a row of rolling elements arranged therebetween, one of the rings being equipped with at least one strain sensor probes configured to transmit strain signals to the electronically control unit. The method comprises:
extracting shape information of the waveform of the strain signal using harmonic components of the strain signal; and
calculating a bearing load estimation as a polynomial function of the harmonic components of the strain signal.

The design of the groove allows the fiber to progressively take a tensile load applied by the friction forces against the sidewalls of the groove.

For example, the optical sensing fiber is protected by a jacket.

For example, the circumferential groove is at the vicinity of the first frontal surface.

Advantageously, the first branch of the groove is provided with a first portion axially extending from the first frontal surface of the first ring, with a second portion extending from the first portion and incurved along a first radius of curvature and with a third portion extending from the second portion towards the first frontal surface and incurved along a second radius of curvature.

The third portion of the first branch of the groove may come out in the circumferential groove of the first ring.

For example, the first portion is straight and extends along the longitudinal axis of the bearing.

As an alternative, the first portion of the first branch could be at least partially incurved or could form an angle with the longitudinal axis of the bearing.

Advantageously, the second branch of the groove is provided with a first portion axially extending from the second frontal surface and a second portion extending from the first portion and at least partially incurved along a third radius of curvature.

For example, the first portion of the second branch of the groove is straight and extend along the longitudinal axis of the bearing.

As an alternative, the first portion of the second branch of the groove could be at least partially incurved or could form an angle with the longitudinal axis of the bearing Each of the radius of curvature is, for example, comprised between 5 mm and 15 mm, for example equal to 10 mm.

The optical fiber associated to the bearing may be located in the first branch of the groove.

In an embodiment, the surface of the first ring, radially opposite to the raceway, further comprises an additional routing axial groove distinct from the groove, the additional routing groove extending axially from the first axial surface to the second axial surface of the first ring and communicates with the groove by inclined portions.

In an embodiment, the surface of the first ring, radially opposite to the raceway of the first ring, is provided with a sloping groove communicating with the groove and, for example, designed to secure the optical fiber by wrapping it around the first ring without damage during transportation of the bearing.

The additional routing groove extends axially from the first frontal surface to the second frontal surface of the first ring and axially parallel with the first portion of the first branch and the first portion of the second branch of the groove.

The surface of the first ring, radially, opposite to the raceway further comprises a first inclined groove connecting the first portion of the first portion of the groove to the additional routing groove and a second inclined groove connecting the first portion of the second branch of the groove to the additional routing groove. The first inclined groove may be inclined along an axis opposite to the axis of inclination of the second inclined groove.

For example, the sloping groove is provided in a part located between the first and second inclined grooves and the second portions respectively of the first and second branches. The sloping groove is connected to the groove and to the additional routing groove. The sloping groove is designed to avoid damage of the optical fiber by breaking or getting nicks when wrapped around the outer diameter of the first ring.

The bearing is, for example, a ball bearing.

For example, the groove is provided on the outer circumferential surface of the outer ring.

Alternatively, the groove is provided on the inner circumferential surface of the inner ring.

According to another aspect, the invention concerns a bearing unit comprising at least two bearings as described above. The two bearings are mounted axially with one of their frontal surfaces in axial contact with each other.

Advantageously, the additional routing groove of the first bearing receiving a second optical fiber associated for sensing loads of the second bearing. The two bearings are, for example, combined in back-to-back configuration, face-to-face configuration, or in tandem confirmation.

The additional routing groove allows to avoid damage between the optical fiber of the first bearing and the optical fiber of the second associated bearing.

In an embodiment, the bearing unit comprises an anti-rotational system comprising a pin mounted in an axial groove provided on the surface of both first rings of the two combined bearings radially opposite to the raceway, the axial groove being located radially opposite to the groove for the optical fiber, for example at 180°, the bearing unit further comprises a slot, perpendicular to the axial groove, receiving a plug having a through-hole for receiving the pin.

The slot has for example negative beveled side-faces configured to cooperate with positive beveled side-faces of the plug. Putting the pin through the plug will push the beveled side-faces of the plug into the slot of the outer ring and therefore provide a self-locking system.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF SOME EMBODIMENTS

Figure 1:
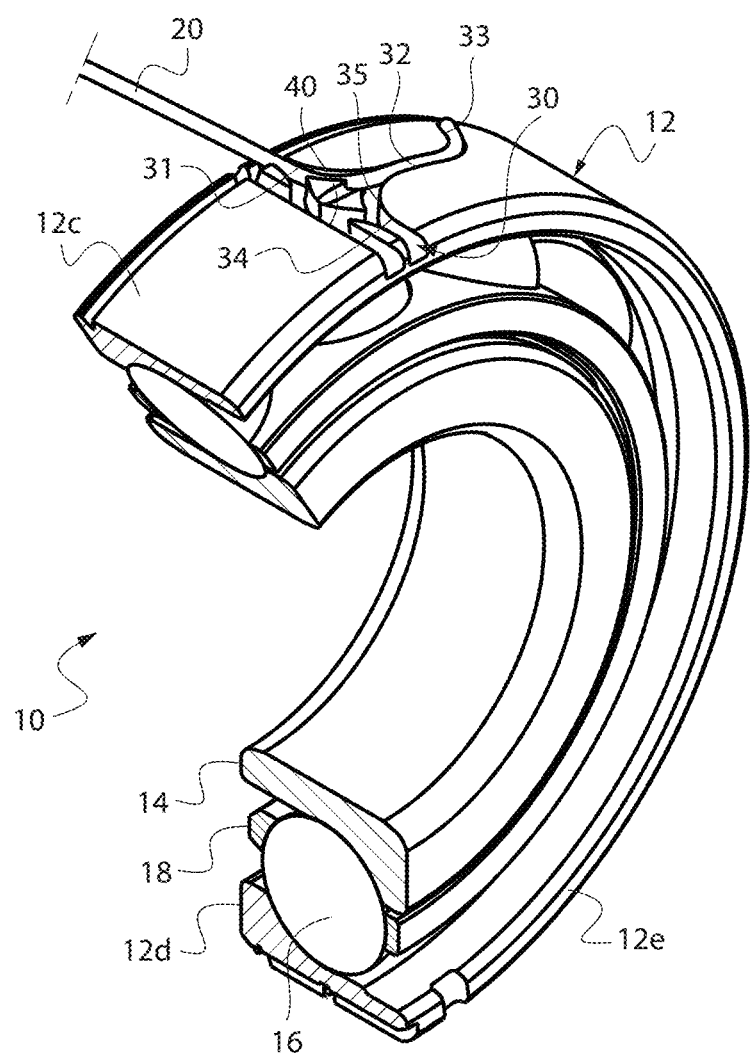
FIG. 1 is a perspective view of a bearing according to an embodiment of the invention.
Figure 2:
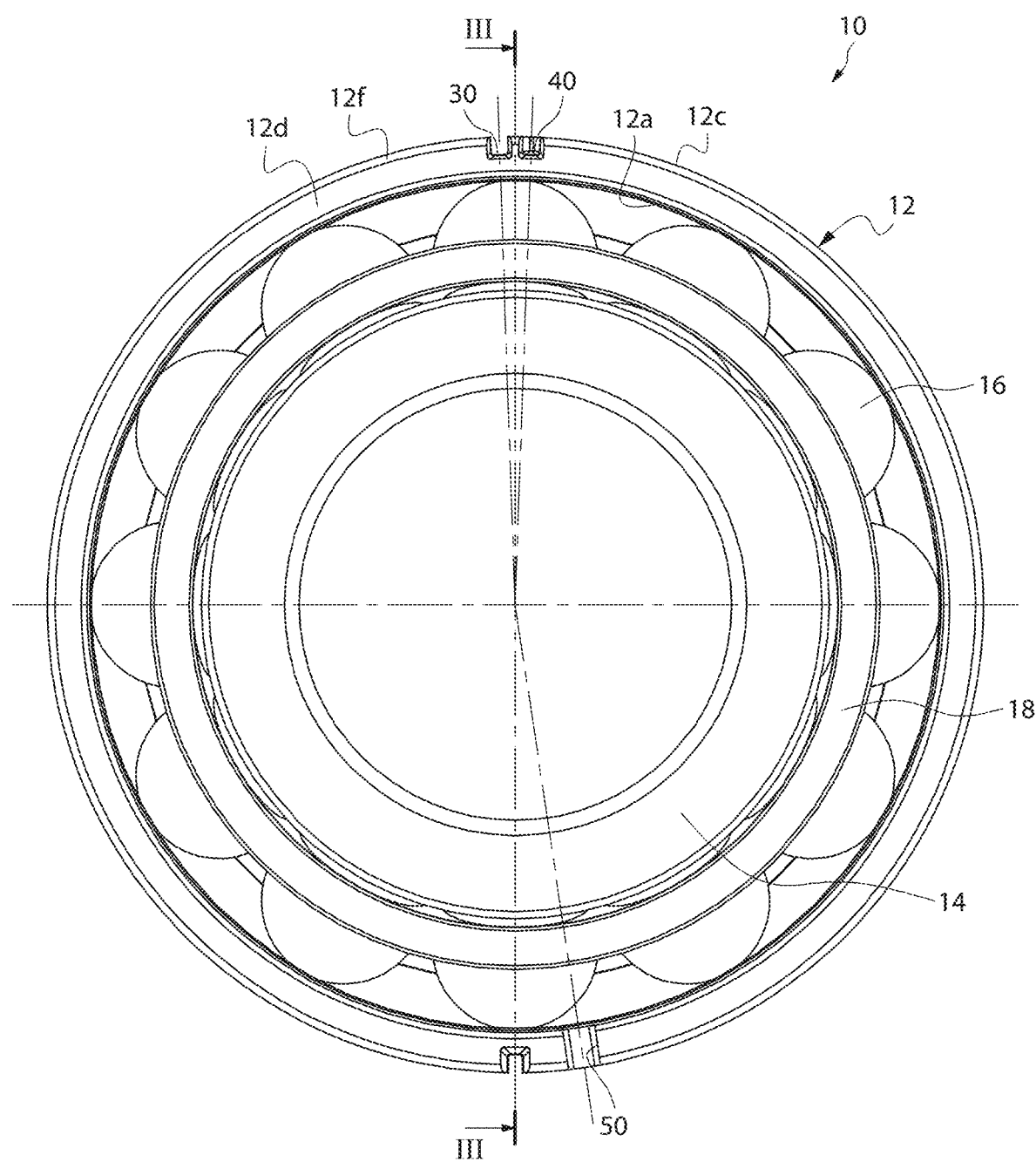
FIG. 2 is a front view of the bearing of FIG. 1.
Figure 3:
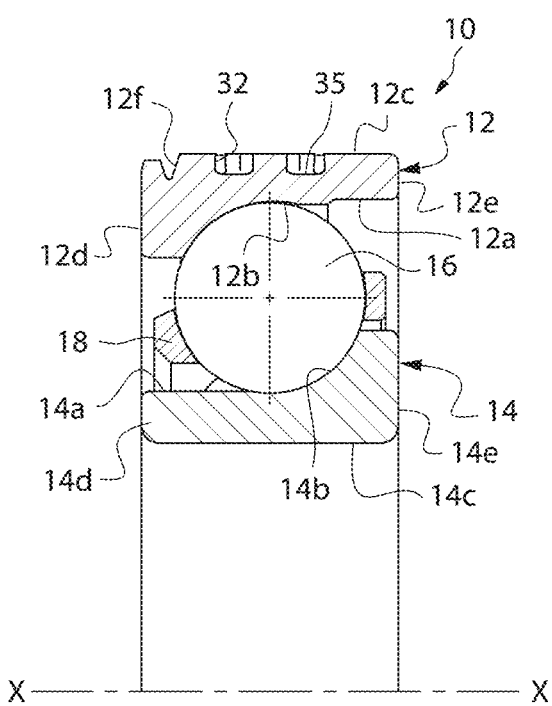
FIG. 3 is a cross-section along line of FIG. 2.

Referring first to FIGS. 1 to 4, which illustrate an embodiment of a bearing 10, for example a ball bearing, comprising an outer ring 12 as a first ring, a rotating inner ring 14 as a second ring, a row of rolling elements 16, such as balls, arranged therebetween, and a cage 18.

The bearing 12 may be of the ball bearing type. However, the invention is not limited to ball bearing and may be applied to taper roller bearing, spherical roller thrust bearing, four-point angular contact ball bearing, deep groove ball bearing, thrust ball bearing, and to any other bearings taking combined axial and radial loads.

As illustrated, the outer ring 12 is solid and has, on its inner cylindrical surface 12a, a toroidal groove 12b, the radius of curvature of which is slightly greater than the radius of the rolling elements 16 and forms a bearing race for the rolling elements 16. The outer ring 12 may be manufactured by machining or by pressing a steel blank, which is then ground and optionally lapped at the bearing race 12b in order to give the ring 12 its geometrical characteristics and its final surface finish.

The outer ring 12 further comprises an outer cylindrical surface 12c, radially opposite to the inner cylindrical surface 12a.

The outer ring 12 also comprises two radial frontal surfaces 12d, 12e which axially delimits the inner cylindrical surface 12a and the outer cylindrical surface 12c. The outer ring 12 further comprises a circumferential groove 12f at the vicinity of a first frontal surface 12d and parallel to the first frontal surface 12d.

As illustrated, the inner ring 14 is solid and has on its outer cylindrical surface 14a a toroidal groove 14b, the radius of curvature of which is slightly greater than the radius of the rolling elements 16 and forms a bearing race for the rolling elements 16. The inner ring 14 may be manufactured by machining or by pressing a steel blank, which is then ground and optionally lapped at the bearing race 14b in order to give the ring 14 its geometrical characteristics and its final surface finish.

The inner ring 14 further comprises an inner cylindrical surface 14c, radially opposite to the outer cylindrical surface 14a. The inner ring 14 also comprises two radial frontal surfaces 14d, 14e which axially delimits the inner cylindrical surface 14c and the outer cylindrical surface 14a. The frontal surfaces 14d, 14e of the inner ring 14 are axially located below the corresponding frontal surface 12d, 12d of the outer ring 12. In other words, the outer ring 12 has an axial length equal to the axial length of the inner ring 14.

In order to monitor the axial and radial loads of the bearing 10; the bearing is equipped with an optical strain gauge, typically a single optical sensing fiber 20. For clarity sake, the fiber 20 has not been represented on FIGS. 2 and 3.

The single optical fiber 20 may comprise a plurality of fiber Bragg gratings, called FBG, for sensing locations evenly spread around the circumference of the ring of the bearing, for example for sensing at least one location additional to the rolling elements.

The single optical fiber 20 comprises a sensing part 20*a* located at an end of the optical fiber 20. An optical signal of the sensing fiber is further analyzed by an optical interrogator (not shown).

The single optical sensing fiber 20 is located in one groove 30 provided on the outer circumferential surface 12*c* of the outer ring 12 of the bearing 10. The optical fiber 20 extends towards the circumferential groove 12*f*. The sensing part 20*a*, including the fiber Bragg gratings, of the optical fiber 20 comes into the circumferential groove 12*f*.

The optical fiber 20 may be partly surrounded by a protecting jacket (not referenced). The sensing part 20*a* of the optical fiber 20 are not surrounded by a protecting jacket and may be called as "naked fiber". The sensing part 20*a* may be fixed in the circumferential groove 12*f*, for example with an adhesive or a coating.

As an alternative, the groove 30 could be provided on the inner surface 14*c* of the first ring 14.

The groove 30 comprises a first branch 30*a* extending from the first frontal surface 12*d* of the first ring 12 and being at least partially incurved along two radius of curvature R1, R2 to extend towards the first frontal surface 12*d*.

The groove 30 further comprises a second branch 30*b* extending from the second frontal surface 12*e* of the first ring 12, axially opposite to the first frontal surface 12*d*, connected to the first branch 30*a*.

The first branch 30*a* comprises a first portion 31 axially extending from a first frontal radial surface 12*d* of the outer ring 12, a second portion 32 extending from the first portion 31 and incurved along a first radius of curvature R1. As illustrated, the first portion 31 of the first branch 30*a* is straight and extend along the longitudinal axis X-X of the bearing 10. As an alternative, the first portion 31 of the first branch 30*a* could be at least partially incurved or may form an angle with the longitudinal axis X-X of the bearing.

The first branch 30*a* further comprises a third portion 33 extending from the second portion 32 towards the first frontal surface 12*d* and incurved along a second radius of curvature R2. The third portion 33 comes out in the circumferential groove 12*f* of the outer ring 12.

The first, second and third portions 31, 32, 33 form the first branch 30*a* of the groove 30 extending from the first frontal radial surface 12*d* into the first circumferential groove 12*f* of the outer ring 12.

The second branch 30*b* of the groove 30 comprises a first portion 34 axially extending from the second frontal surface 12*e* and a second portion 35 extending from the first portion 34 of the second branch 30*b* and incurved along a third radius of curvature R3. As illustrated, the first portion 34 of the second branch 30*b* is straight and extend along the longitudinal axis X-X of the bearing 10. As an alternative, the first portion 34 of the second branch 30*b* could be incurved or may form an angle with the longitudinal axis X-X of the bearing.

The first portion 34 of the second branch 30*b* is coaxial with the first portion 31.

The first and second portions 34, 35 form the second branch 30*b* of the groove 30 extending from the second frontal radial surface 12*e* into the first branch 30*a*.

The two branches 30*a*, 30*b* of the groove 30 form a particular shape close to Greek letter lambda $\lambda$.

Each of the radius of curvature R1, R2, R3 is, for example, comprised between 5 mm and 15 mm, for example equal to 10 mm.

Figure 4:
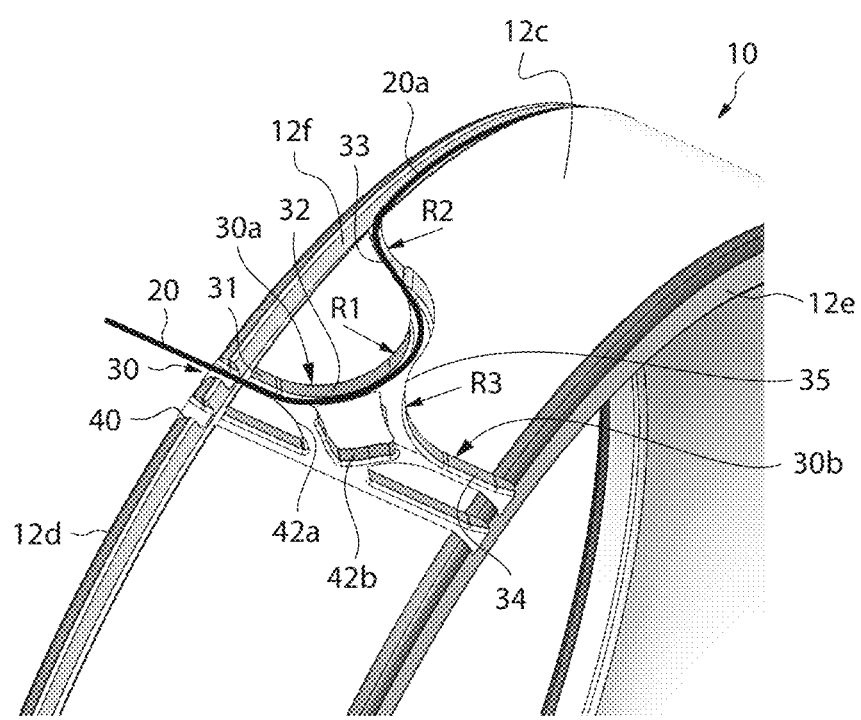
FIG. 4 is detailed view of the bearing of FIG. 1.

As illustrated on FIGS. 1 and 4, the optical fiber 20 associated to the bearing 10 is located in the first branch 30*a* of the groove 30.

The groove 30 enables the optical fiber 20 to exit the outer ring 12 in either of the axial directions by selecting the first or second branch 30*a* or 30*b* of the groove 30.

The design of the groove 30 allows the fiber 20, for example, in its flexing jacket, to progressively take a tensile load applied by the friction forces against the sidewalls of the groove of at least 50 N, for example at least 100 N.

The particular shape of the groove 30 enables the optical fiber 20 to exit the outer ring 12 in both axial directions without bending the optical fiber below a minimum bending radius and allows the sensing part 20*a* of the fiber to be particularly close to the element to be sensed.

As illustrated on FIG. 4, an additional routing groove 40 distinct from the groove 30 is provided, if required, on the outer surface 12*c* of the outer ring 12. Alternatively, the additional routing groove may be provided on the inner surface 14*c* of the inner ring 14 when the groove 30 is provided on the inner ring 14 typically for an outer ring rotating installation.

The additional routing groove 40 extends axially from the first frontal surface 12*d* to the second frontal surface 12*e* of the outer ring 12 and axially parallel with the first portions 31, 34 respectively of the first and second branches 30*a*, 30*b* of the groove 30.

The outer surface 12*c* of the outer ring 12 further comprises a first inclined groove 42*a* connecting the first portion 31 of the groove 30 to the additional routing groove 40 and a second inclined groove 42*b* connecting the first portion 34 of the second branch 30*b* of the groove 30 to the additional routing groove 40. The first inclined groove 42*a* is inclined along an axis opposite to the axis of inclination of the second inclined groove 42*b*.

The additional routing groove 40 is configured to receive a second optical fiber associated for sensing loads of a second bearing 10.

The additional routing groove 40 allows to avoid damage between the optical fiber 20 of the first bearing 10 and the optical fiber of the second associated bearing 10.

Figure 5:
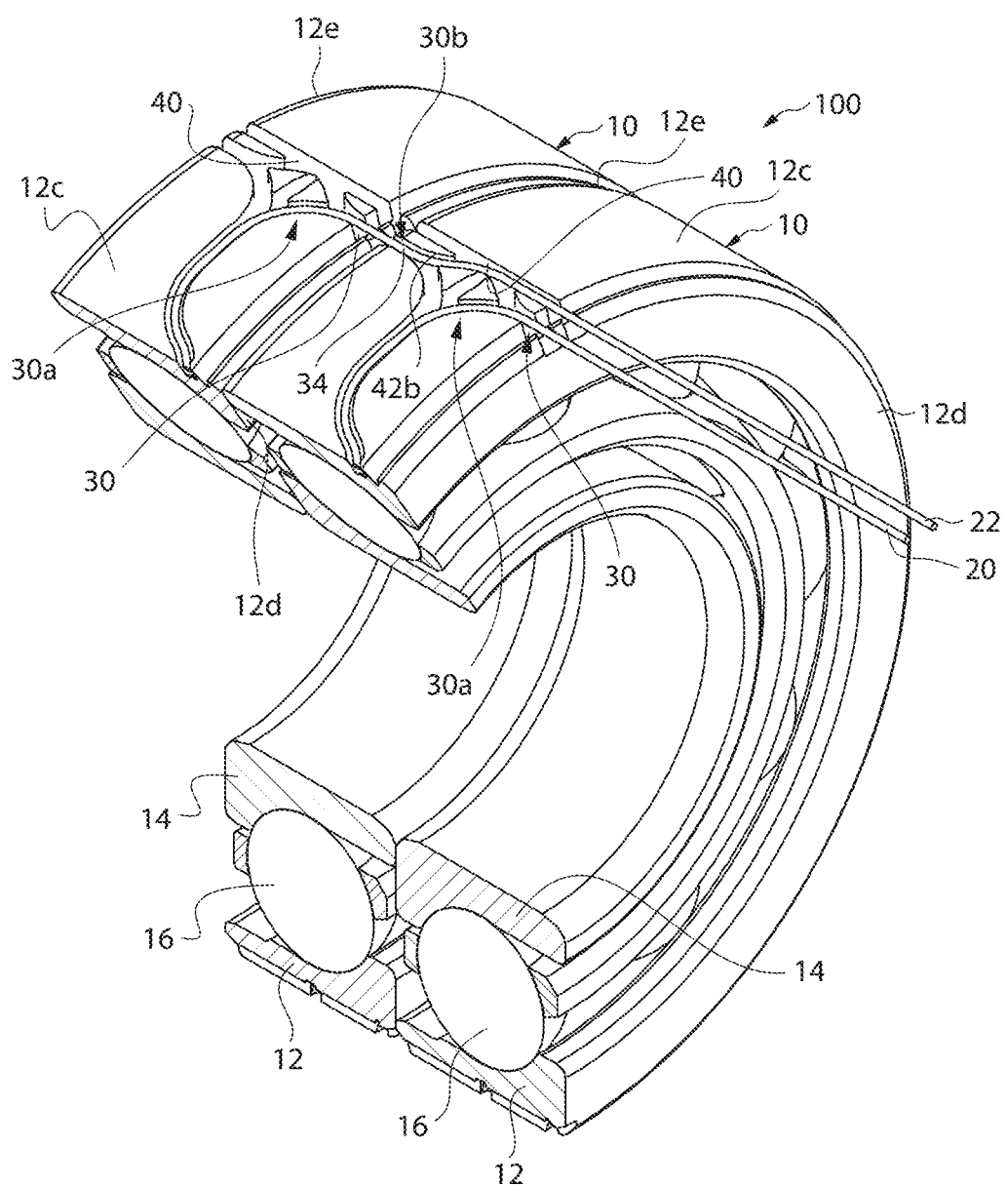
FIGS. 5 to 8 illustrate bearing units according to different embodiments comprising two bearings of FIG. 1 assembled in different manners.
Figure 6:
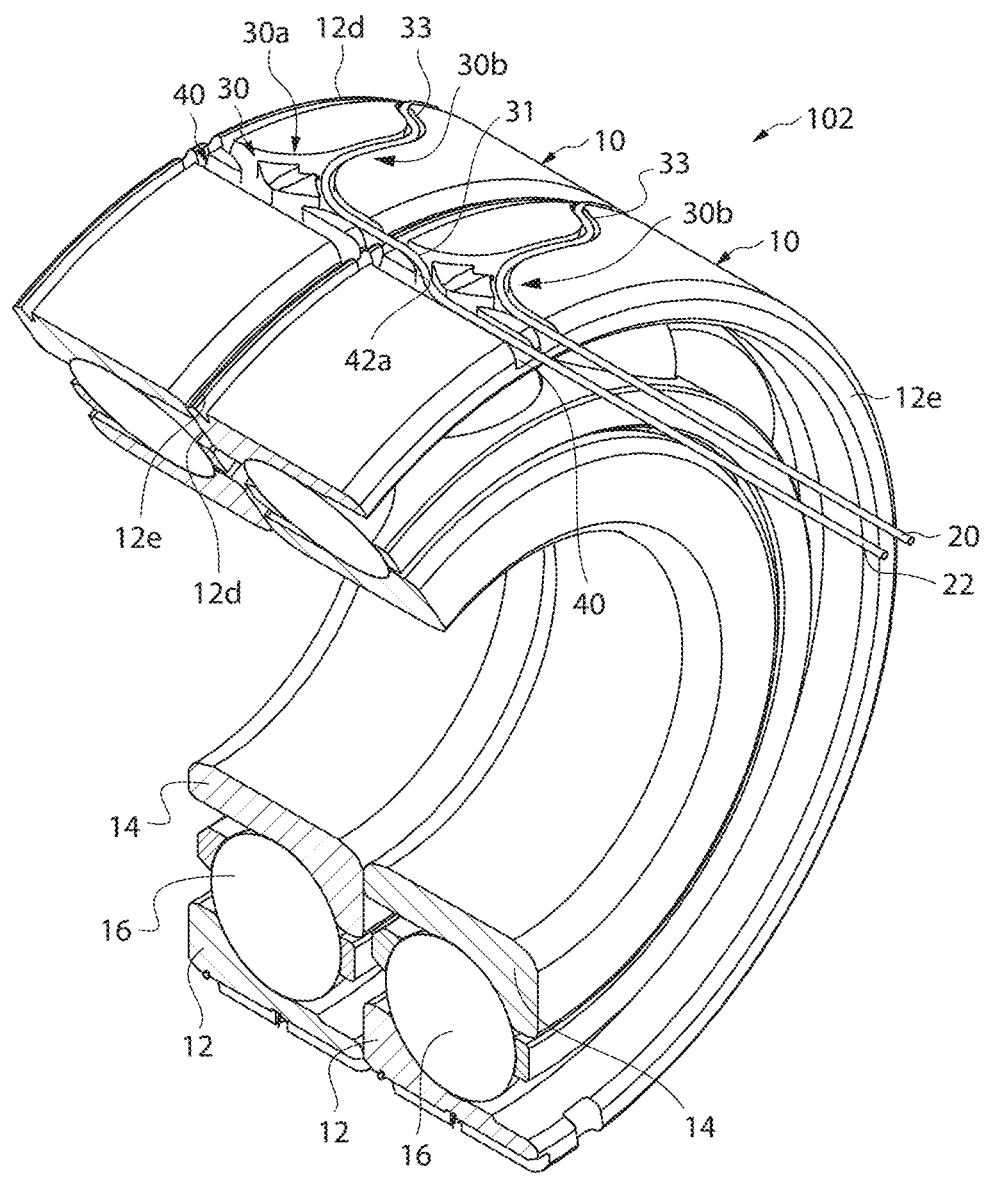
Figure 7:
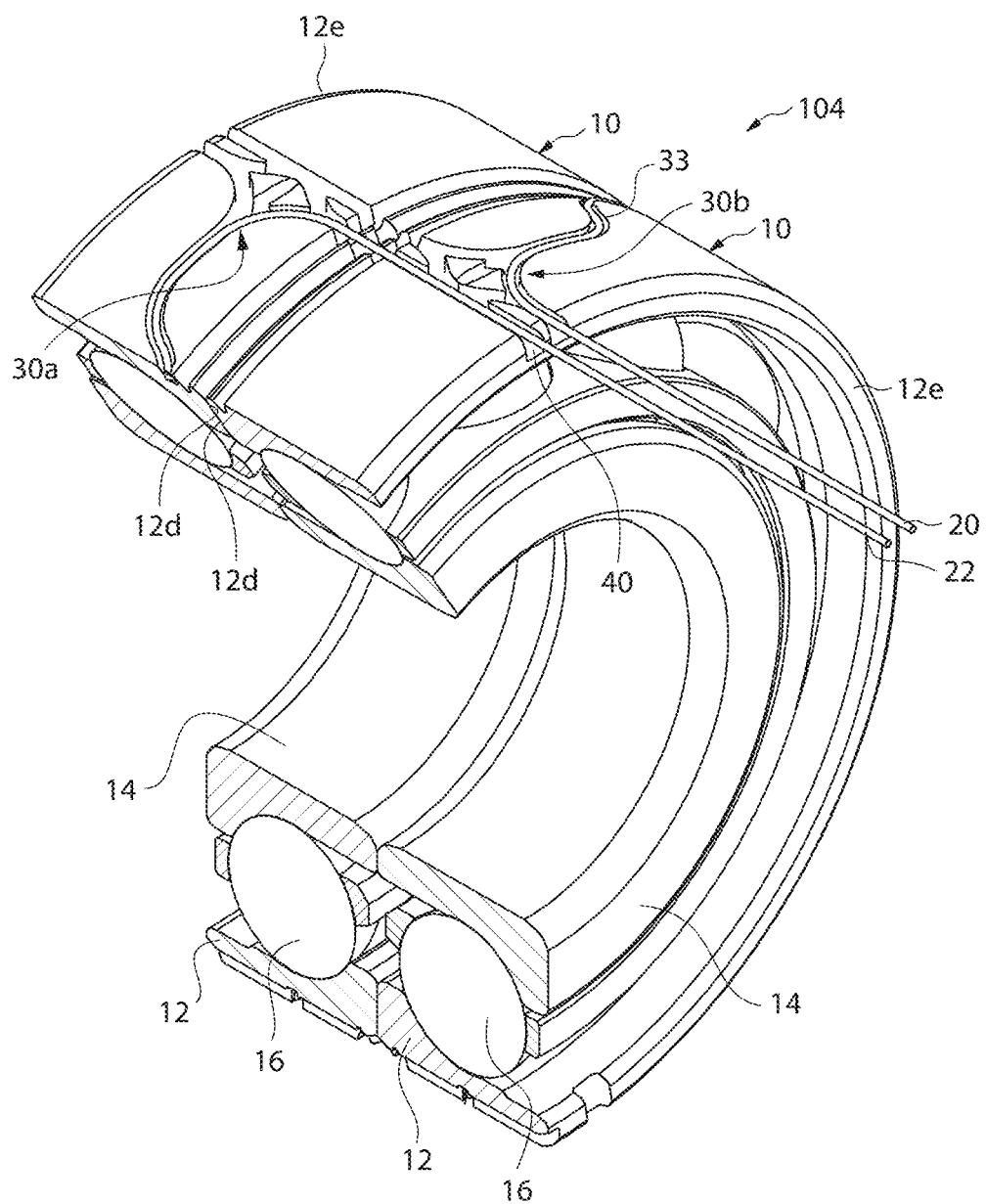
Figure 8:
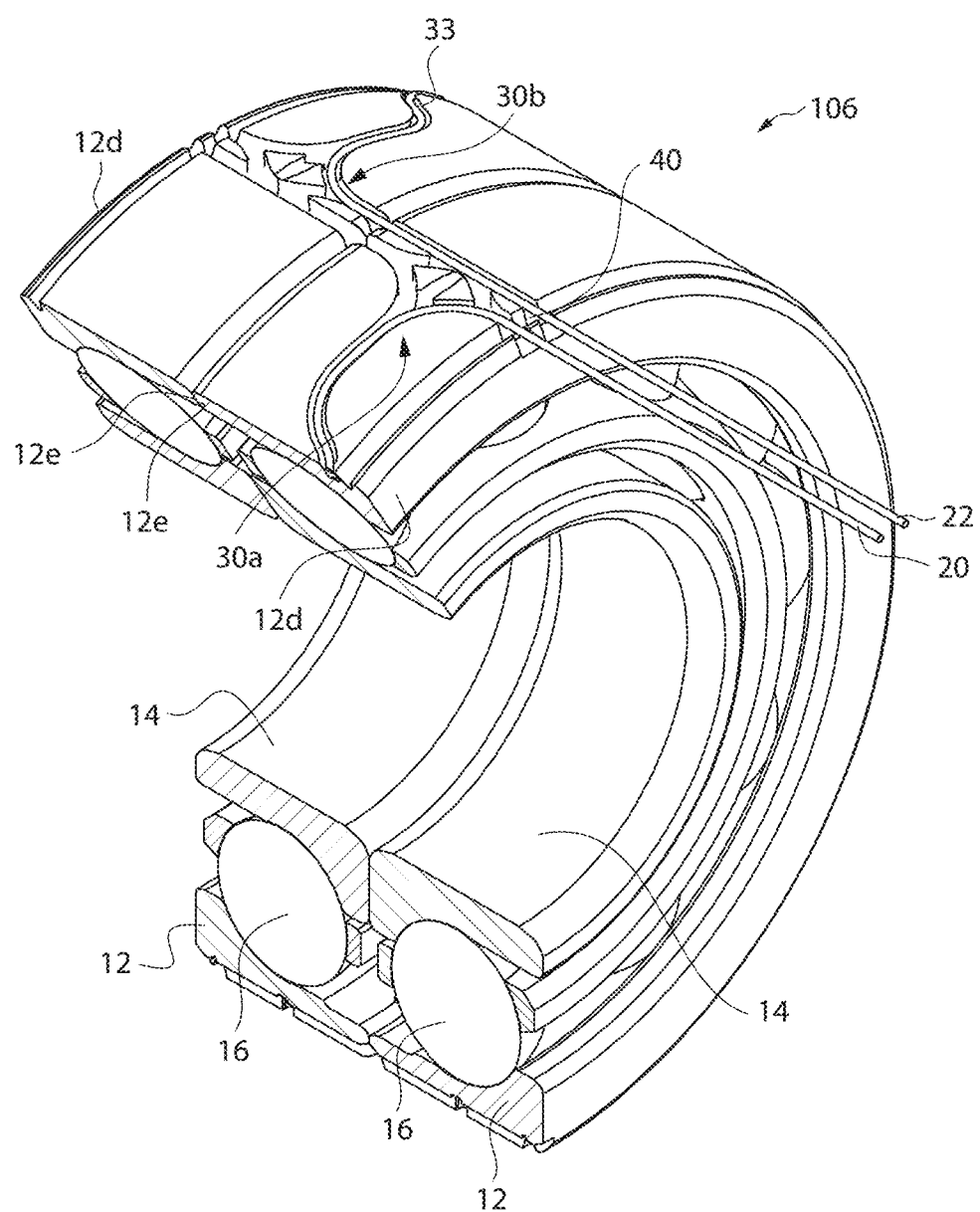

FIGS. 5 to 8 show bearing units having two combined bearings 10 of the embodiment of FIGS. 1 to 4. The shape of the groove 30 allows to combine at least two bearings in tandem with the optical fiber exiting on the back side of the bearings, as shown in FIG. 5, tandem with the optical fiber exiting on the face side of the bearings as shown in FIG. 6 or in back-to-back as shown in FIG. 7 or in face-to-face as shown in FIG. 8 in dual sensing arrangements in fixed positions to each other, using single optical fiber 20, 22 associated to one bearing 10.

In the embodiment of FIG. 5, the first optical fiber 20, for example with a protecting jacket, associated to the first bearing 10 is located in the first branch 30*a* of the groove 30 of the outer ring 12 of the first bearing and the second optical fiber 22 associated with the second bearing 10 is located in the first branch 30*a* of the groove 30 of the outer ring 12 of the second bearing and passes through the additional routing groove 40, the second inclined groove 42b and the first portion 34 of the second branch 30b of the outer ring 12 of the first bearing.

In the embodiment of FIG. 6, the first optical fiber 20, for example with a protecting jacket, associated to the first bearing 10 is located in the second branch 30b and the third portion 33 of the first branch 30a of the groove 30 of the outer ring 12 of the first bearing and the second optical fiber 22 associated with the second bearing 10 is located in the second branch 30b and the third portion 33 of the first branch 30a of the groove 30 of the outer ring 12 of the second bearing and passes through the additional routing groove 40, the first inclined groove 42a and the first portion 31 of the outer ring 12 of the first bearing.

In the embodiment of FIG. 7, the first optical fiber 20 associated to the first bearing 10 is located in the second branch 30b and the third portion 33 of the first branch 30a of the groove 30 of the outer ring 12 of the first bearing and the second optical fiber 22 associated with the second bearing 10 is located in the first branch 30a of the groove 30 of the outer ring 12 of the second bearing and passes through the additional routing groove 40 of the outer ring 12 of the first bearing.

In the embodiment of FIG. 8, the first optical fiber 20 associated to the first bearing 10 is located in the first branch 30a of the groove 30 of the outer ring 12 of the first bearing and the second optical fiber 22 associated with the second bearing 10 is located in the second branch 30b and the third portion 33 of the first branch 30a of the groove 30 of the outer ring 12 of the second bearing and passes through the additional routing groove 40 of the outer ring 12 of the first bearing.

Figure 9:
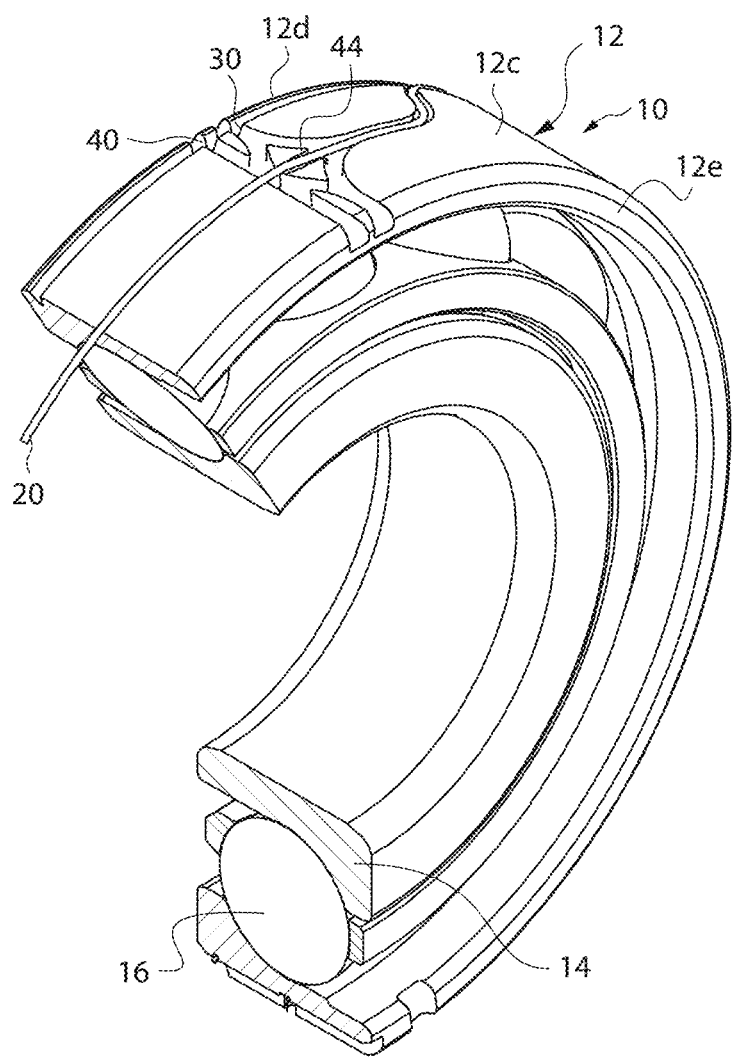
FIG. 9 is a perspective view of a bearing according to another embodiment of the invention.

In the embodiment of FIG. 9, in which the same elements bear the same reference, the outer circumferential surface 12c of the outer ring 12, and notably the part (not referenced) located between the first and second inclined grooves 42a, 42b and the second portions 32, 35 respectively of the first and second branches 30a, 30b is provided with a sloping groove 44 connected to the groove 30 and to the additional routing groove 40. The sloping groove 44 is designed to avoid damage of the optical fiber 20 by breaking or getting nicks when wrapped around the outer diameter of the outer ring 12 without damage for transportation of the bearing 10.

Figure 10:
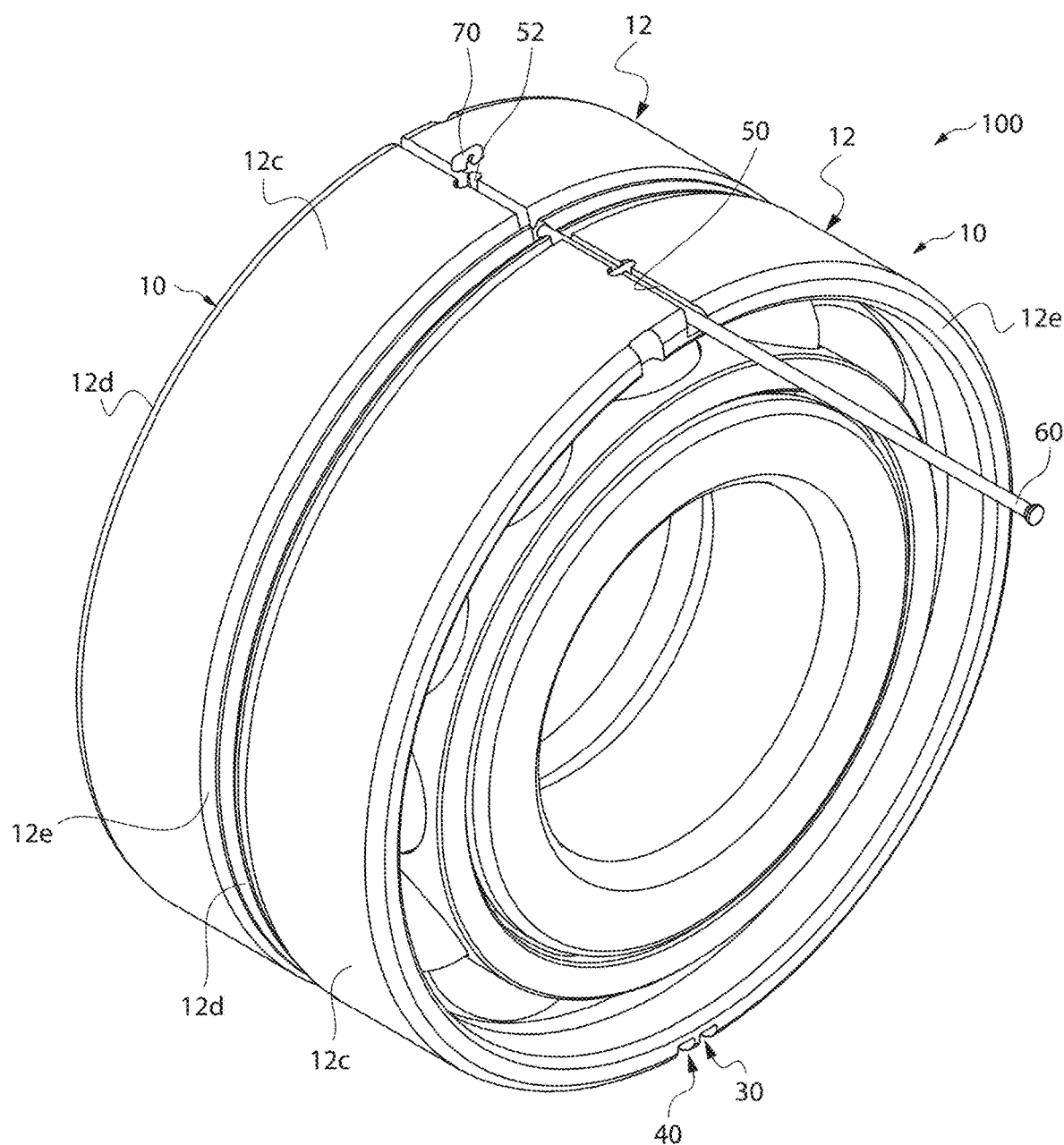
FIG. 10 is a view of the bearing unit of FIG. 6, showing an anti-rotational system.
Figure 11:
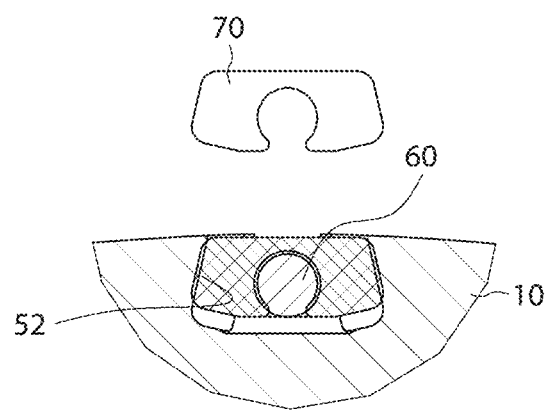
FIG. 11 is a detailed view of the anti-rotational system of FIG. 10.

The bearing units of FIGS. 5 to 8 can be maintained in a fixed position thanks to an anti-rotational element. An example of the anti-rotational element is shown on FIGS. 10 and 11, which refer to the embodiment of FIG. 7. However, the anti-rotational element may be applied to the embodiments of FIGS. 5, 6 and 8.

The anti-rotational element comprises a pin 60 mounted in an axial groove 50 provided on the outer circumferential surface 12c of both outer rings 12 of the two bearings 10 to be combined. The axial groove 50 is located opposite to the groove 30 for the optical fiber 20, for example at 180°. A slot 52, perpendicular to the axial groove 50 is provided on the outer ring 12 and is configured to receive a plug 70. The slot 52 has negative beveled side-faces configured to cooperate with positive beveled side-faces of the plug 70. The plug 70 further comprises a centered through-hole (not referenced) configured to receive the pin 60.

Putting the pin 60 through the plug 70 will push the beveled side-faces of the plug 70 into the slot 52 of the outer ring 12 and therefore provide a self-locking system.

Thanks to the optical fiber 20 located in the groove 30, it is possible to use two different methods of estimating the rotational speeds of the shaft, such as the rolling element speed by using strain pulses from the sensor position, and the true shaft speed, by using strain spectra detection, for example using Fast Fourier Transformation analysis. Those methods are known and will not be further described. A detection method using both methods enable both analyzing of contact angle variations with the bearing caused by speed and loads on the bearing.

Thanks to the particular shape of the groove 30, the optical fiber 20 is well protected against breakage at the end of the fixation to the outer ring. The optical fiber is also easily routed in either axial direction depending of the requirements of the application by avoiding fiber bending radius below of about 5 to 10 mm. Additionally, the angular space taken by the groove is so small that the fiber Bragg gratings of the optical fiber may be angularly spaced from at least one additional fiber Bragg gratings at a required distance.

The invention claimed is:

1. A bearing comprising:
   a first ring,
   a second ring, and
   at least one row of rolling elements radially located between raceways provided on the first and second ring,
   a single optical sensing fiber mounted in a groove provided on a surface of the first ring radially opposite to the raceway of the first ring, the optical fiber comprising at least one sensing part; and the groove is provided with:
   a first branch extending from a first frontal surface of the first ring and being at least partially incurved along at least one radius of curvature to extend towards a circumferential groove parallel to the first frontal surface; at least the sensing part of the optical fiber coming out into the circumferential groove, and
   a second branch extending from a second frontal surface of the first ring, axially opposite to the first frontal surface, connected to the first branch, the second branch being at least partially incurved along at least one radius of curvature.

2. The bearing according to claim 1, wherein the first branch of the groove is provided with a first portion extending axially from the first frontal surface of the first ring, with a second portion extending from the first portion and incurved along a first radius of curvature, and with a third portion extending from the second portion towards the first frontal surface and incurved along a second radius of curvature.

3. The bearing according to claim 2, wherein the third portion of the first branch of the groove is coming out in the circumferential groove of the first ring.

4. The bearing according to claim 1, wherein the second branch of the groove is provided with a first portion axially extending from the second frontal surface and a second portion extending from the first portion and at least partially incurved along a third radius of curvature.

5. The bearing according to claim 1, wherein the optical fiber associated to the bearing is located in the first branch of the groove.

6. The bearing according to claim 1, wherein the surface of the first ring, radially opposite to the raceway, further comprises an additional routing groove distinct from the groove, the additional routing groove extending axially from the first axial surface to the second axial surface of the first ring and communicates with the groove by inclined portions.

7. A bearing unit comprising:
   at least two bearings according to claim 6, wherein the bearings being mounted in axial contact.

8. The bearing unit according to claim 7, wherein the additional routing groove of the first bearing receiving a second optical fiber associated for sensing loads of the second bearing.

9. The bearing unit according to claim 8, further comprising an anti-rotational system comprising a pin mounted in an axial groove provided on a surface opposite the raceway of each first ring of the first bearing and the second bearing, the axial groove being radially opposite to the groove for the first optical fiber, the bearing unit further comprises a slot, perpendicular to the axial groove receiving to receive a plug having a through-hole for receiving the pin.

10. The bearing according to claim 1, wherein the surface of the first ring, radially opposite to the raceway of the first ring, is provided with a sloping groove communicating with the groove.

\* \* \* \* \*